June 22, 1926.

R. C. NEWHOUSE 1,589,712

PROCESS OF TREATING SLURRY

Filed Jan. 30, 1925

Inventor
R. C. Newhouse
by G. F. DeWein
Attorney

Patented June 22, 1926.

1,589,712

UNITED STATES PATENT OFFICE.

RAY C. NEWHOUSE, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

PROCESS OF TREATING SLURRY.

Application filed January 30, 1925. Serial No. 5,800.

This invention relates in general to improvements in the art of treating substances which have the characteristic of hardening when mixed with water, and relates more specifically to an improved process of treating slurry in order to prevent setting thereof.

An object of the invention is to provide an improved process of treating slurry comprising a mixture of water and material containing comminuted slag or other substances having similar characteristics.

It is common commercial practice in the cement industry to utilize a mixture of limestone and blast furnace slag in the manufacture of Portland cement. These ingredients are mixed and reduced to pulverulent condition in a grinding mill such as a tube mill, and are appreciably heated during the reduction process. While the materials are ordinarily comminuted in dry condition, it has been found advantageous in some instances to pulverize such substances in the presence of water. Finely ground blast furnace slag is known to possess the characteristic of absorbing water and of eventually setting or hardening. This characteristic is more prominent when the material is heated, and the setting tendency is materially augmented by heating the material. When additional water is added to slurry containing material such as slag, the material absorbs undesirably large quantities of water which must eventually be driven off by the application of heat as in a kiln. In order to retard the setting tendency of the comminuted slag, it has heretofore been proposed to add dextrin to the mixture before delivering it to the storage tanks or receptacles. While the addition of dextrin retards the setting action to some extent, it is expensive procedure and is not altogether satisfactory.

It has been discovered that the tendency of materials such as slag to absorb water and to solidify or set, may be retarded and substantially eliminated if the temperature of the mixture of slag and water is reduced to substantially normal or atmospheric temperature or lower, as soon as the mixture leaves the source of heat. If the material is cooled immediately after it leaves the comminuating mill and before it is delivered to the storage tanks, subsequent hardening or setting within a reasonable time is prevented. This process of eliminating setting of slurry containing substances such as slag, by cooling the slag bearing slurry before absorption of an excess quantity of water has taken place forms the subject of the present improvement.

The improved process may be readily applied in systems of manufacturing cement such as disclosed in Patent No. 1,184,656 granted May 23, 1916, as well as in any cement plants utilizing the wet process of manufacturing cement from a mixture of slag and calcareous material.

A clear conception of the manner of exploiting the improved process and of several embodiments of appartus for effecting commercial exploitation of the same, may be had by referring to the drawing accompanying and forming a part of this specification in which like reference characters designate the same or similar parts in the various views.

Figure 1:
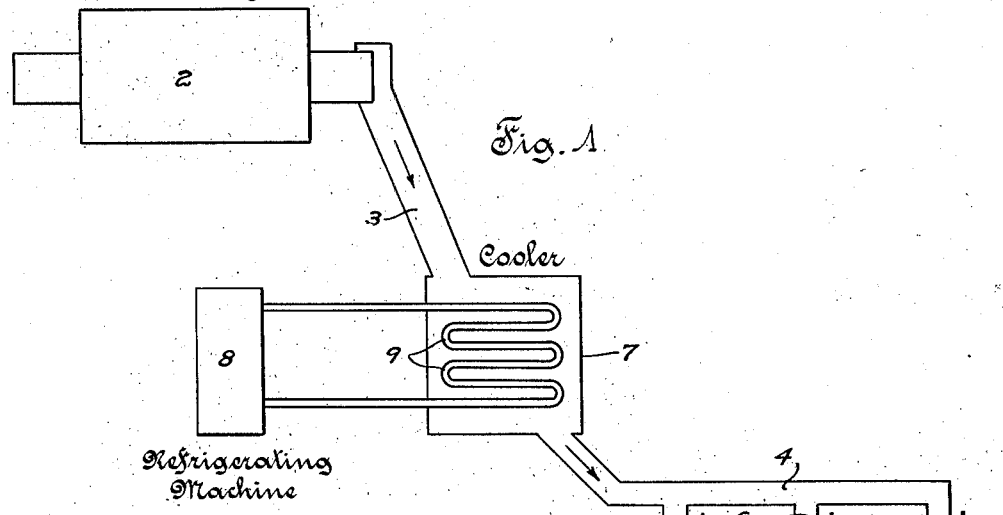
Fig. 1 is a diagram illustrating one assemblage of elements for exploiting the improved process of treating slurry.

Referring specifically to Fig. 1, the comminuting machine 2 may be of the well known tube or ball mill type and is adapted to deliver a mixture of comminuted solids and water through a discharge device 3 of any convenient construction, to a cooler or cooling chamber 7. Within the cooling chamber 7 is located a cooling coil 9 through which a cooling medium may be circulated from a refrigerating machine 8. The material delivered from the comminuting machaine 2 by the conveying device 3 is brought in contact with the coils 9 while in relatively warm condition and is quickly cooled to or below atmospheric temperature by the refrigerating medium passing through the coils 9. The cooled slurry is discharged from the chamber 6 through a distributor 4 to the storage tanks or receptacles 5 from which it may be withdrawn as desired. The control valves 6 enable proper distribution of the slurry to the various receptacles 5, and similar means may be employed to control the delivery of slurry from the tanks.

Figure 2:
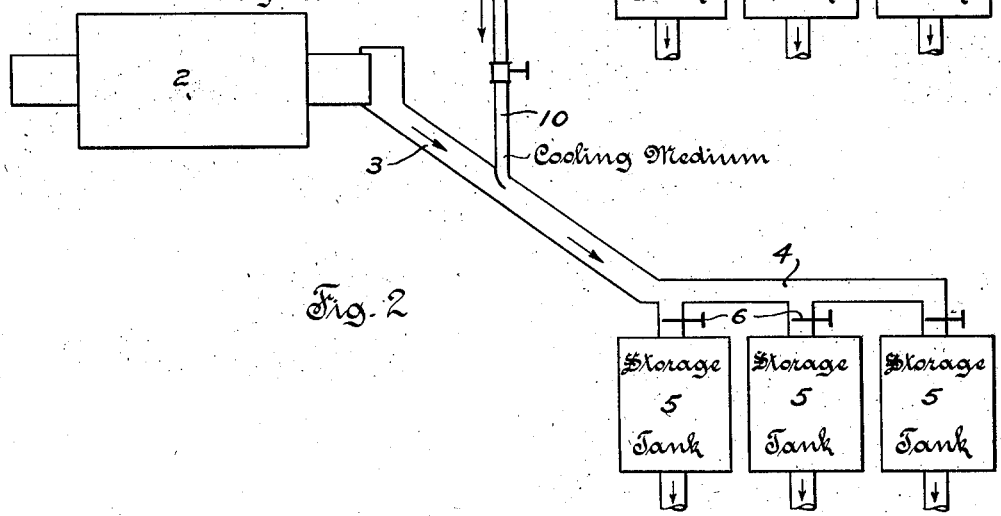
Fig. 2 is a diagram of a modified assemblage of elements for effecting commercial exploitation of the improved process of treating slurry.

Referring specifically to the assemblage of elements illustrated in Fig. 2, the comminuting machine 2 is adapted to deliver a mixture of comminuted solids and water in relatively warm condition, through the conveying device 3 wherein cold water or other cooling medium is admitted directly to the mixture through an inlet 10, and quickly reduces the temperature of the slurry to or below atmospheric temperature. The material thus cooled is delivered through a distributor 4 and past the valves 6 to storage tanks or receptacles 5 from which it may be withdrawn as desired.

If the material is not cooled as quickly as possible after having been heated, it absorbs considerable water. By reducing the temperature of the slurry to or below substantially normal or atmospheric temperature as quickly as possible after having been heated, setting or hardening of the constituents of the slurry by absorption of water is substantially prevented and the material may be freely withdrawn from the tanks 5 within a reasonable length of time without difficulty.

If the apparatus of Fig. 1 is employed, it is unnecessary to add water to the slurry leaving the comminuting machine, thus eliminating the necessity of subsequently removing the added water. If the apparatus of Fig. 2 is employed, the excess water admitted as a cooling medium, must be removed prior to subsequent treatment of the material in a kiln or the like. Either form of apparatus, however, effectively eliminates the setting nuisance and avoids difficulty in subsequent handling of the slurry.

It should be understood that it is not desired to limit the invention to the exact steps of the process herein shown and described, for other modifications within the scope of the claims may occur to persons skilled in the art.

It is claimed and desired to secure by Letters Patent:

1. The process of treating heated slurry having the characteristic of absorbing water and of setting when permitted to cool naturally, which comprises, effecting cooling of the slurry at a sufficiently rapid rate to prevent absorption of enough water to cause setting.

2. The process of treating heated slag bearing slurry, which comprises, effecting cooling of the slurry at a sufficiently rapid rate to prevent the slag from absorbing enough water to cause setting.

3. The process of treating slurry having the characteristic of absorbing water and of setting when permitted to cool naturally, which comprises, comminuting the solid slurry forming material in the presence of water to produce heated slurry, and subsequently effecting cooling of the slurry at a sufficiently rapid rate to prevent absorption of enough water to cause setting.

4. The process of treating slag bearing slurry, which comprises, comminuting slag in the presence of water to produce heated slurry, and subsequently effecting cooling of the slurry at a sufficiently rapid rate to prevent the slag from absorbing enough water to cause setting.

In testimony whereof, the signature of the inventor is affixed hereto.

RAY C. NEWHOUSE.